US010780848B2

(12) United States Patent  
Ogihara et al.

(10) Patent No.: US 10,780,848 B2  
(45) Date of Patent: Sep. 22, 2020

(54) VEHICLE FLOOR STRUCTURE

(71) Applicants: TOYOTA BOSHOKU KABUSHIKI KAISHA, Aichi (JP); HINO MOTORS, LTD., Tokyo (JP)

(72) Inventors: Masanori Ogihara, Aichi (JP); Toshihiko Yamanaka, Tokyo (JP)

(73) Assignees: TOYOTA BOSHOKU KABUSHIKI KAISHA, Aichi (JP); HINO MOTORS, LTD., Tokyo (JP)

( * ) Notice: Subject to any disclaimer, the term of this patent is extended or adjusted under 35 U.S.C. 154(b) by 37 days.

(21) Appl. No.: 16/390,790

(22) Filed: Apr. 22, 2019

(65) Prior Publication Data

US 2019/0322230 A1 Oct. 24, 2019

(30) Foreign Application Priority Data

Apr. 23, 2018 (JP) .................... 2018-082350

(51) Int. Cl.
*B60R 16/02* (2006.01)
*B62D 25/20* (2006.01)
*H01B 7/00* (2006.01)
*H02G 3/32* (2006.01)
*B60N 2/07* (2006.01)

(52) U.S. Cl.
CPC .......... *B60R 16/0215* (2013.01); *B62D 25/20* (2013.01); *H01B 7/0045* (2013.01); *H02G 3/32* (2013.01); *B60N 2/0705* (2013.01)

(58) Field of Classification Search
CPC . B60R 16/0215; B60R 16/027; B60R 16/023; B60R 16/03; B60R 16/0207; H01B 7/0045; H02G 3/30; H02G 3/32; H02G 3/36; H02G 3/38; H02G 3/383; B60N 2002/0264
USPC ....................................... 296/65.13
See application file for complete search history.

(56) References Cited

U.S. PATENT DOCUMENTS

| | | | |
|---|---|---|---|
| 2016/0031393 A1* | 2/2016 | Oga | H01R 11/01 174/72 A |
| 2016/0280157 A1* | 9/2016 | Katou | H02G 3/0462 |
| 2018/0254642 A1* | 9/2018 | Corrie | H01R 31/065 |
| 2019/0084503 A1* | 3/2019 | Kajihara | B60R 16/037 |

FOREIGN PATENT DOCUMENTS

JP     09-039686     2/1997  
JP     6292103 B2 *     3/2018

* cited by examiner

*Primary Examiner* — Dennis H Pedder  
(74) *Attorney, Agent, or Firm* — Greenblum & Bernstein, P.L.C.

(57) ABSTRACT

A vehicle floor structure includes a first floor member arranged on a floor of a vehicle; a second floor member arranged in a position that is horizontally offset with respect to the first floor member and is adjacent to the first floor member; a wire harness including a portion arranged below the first floor member and the second floor member, extending from a first floor member side to a second floor member side, and having an end situated on the first floor member side and coupled to a connector; and a restrictor configured to restrict a crossover portion of the wire harness to be below the connector. The crossover portion is a portion of the wire harness situated below an interface between the first floor member and the second floor member.

7 Claims, 8 Drawing Sheets

VEHICLE FLOOR STRUCTURE

CROSS-REFERENCE TO RELATED APPLICATIONS

This application claims the benefit of Japanese Patent Application No. 2018-082350 filed on Apr. 23, 2018 with the Japan Patent Office, the entire disclosure of which is incorporated herein by reference.

BACKGROUND

The present disclosure relates to a vehicle floor structure including a wiring structure of a wire harness.

The wire harness is used for transmission of electricity or transmission and reception of an electric signal. For this reason, the wire harness is usually provided with some kind of structure as countermeasures against water damage as disclosed in, for example, Japanese Unexamined Patent Application Publication No. H9-039686.

SUMMARY

As disclosed in Japanese Unexamined Patent Application Publication No. H9-039686, the wire harness is electrically coupled to a different wire harness via a connector. The wire harness is covered with an insulation coating; and therefore, the wire harness itself generally has sufficient water resistance. However, since the connector is engaged with a different connector disposed at the different wire harness, there is an issue that the connector has less water resistance compared with the wire harness.

Considering the aforementioned issue, the present disclosure discloses examples of a vehicle floor structure that has a new structure as countermeasures against water damage.

A vehicle floor structure in one example of the present disclosure comprises a first floor member arranged on a floor of a vehicle; a second floor member arranged in a position that is horizontally offset with respect to the first floor member and is adjacent to the first floor member; and a wire harness comprising a portion arranged below the first floor member and the second floor member, extending from a first floor member side to a second floor member side, and having an end situated on the first floor member side and coupled to a connector.

Desirably, the vehicle floor structure in the aforementioned example comprises a restrictor configured to restrict a position of a crossover portion of the wire harness to be below the connector. The crossover portion is a portion of the wire harness situated below an interface of the first floor member and the second floor member.

Accordingly, even in a case where a fluid such as water enters from the interface towards the wire harness and adheres to the crossover portion, the fluid adhered to the crossover portion can be inhibited from reaching the connector via the crossover portion.

The vehicle floor structure in one example of the present disclosure may be configured as below.

Desirably, the restrictor is disposed on at least one of the first floor member or the second floor member. This can facilitate installment of the restrictor when manufacturing the vehicle floor structure.

Desirably, the vehicle floor structure further comprises a harness holder member configured to hold at least a portion of the wire harness situated on the second floor member side, and a support member configured to support the harness holder member and the connector and arranged below the harness holder member and the connector. Desirably, the restrictor is disposed on the support member. This can facilitate installment of the restrictor when manufacturing the vehicle floor structure.

In the vehicle floor structure, desirably, the first floor member is a leg cover that covers a part of a body of the vehicle; and the second floor member is a sliding device that slidably supports a seat main body.

BRIEF DESCRIPTION OF THE DRAWINGS

Example embodiments of the present disclosure will be described hereinafter by way of example with reference to the accompanying drawings, in which.

DETAILED DESCRIPTION OF THE PREFERRED EMBODIMENTS

Figure 1:
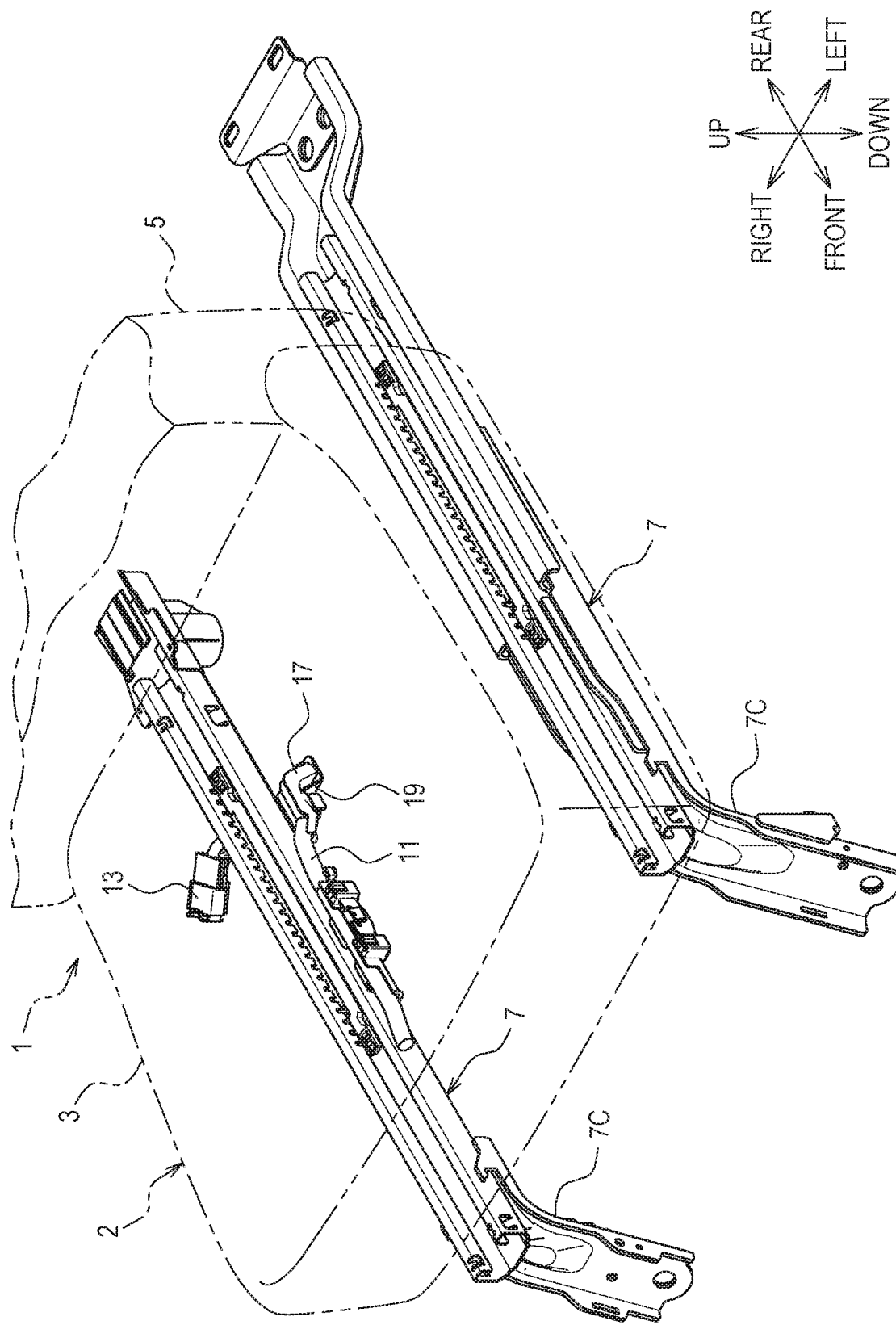
FIG. 1 is a diagram showing a vehicle seat according to a first embodiment.

Embodiments of the present disclosure explained hereinafter show examples of embodiments that belong to the technical scope of the present disclosure. Matters to specify the invention recited in the claims are not limited to specific configurations or structures that are shown in the embodiments explained hereinafter.

At least in respect of a member or portion that is labeled with a reference numeral for explanations, there is at least one in number of such a member or portion unless the number is otherwise specified as "only one of" or the like. In other words, there may be two or more of such a member or portion when the number is not specified as "only one of" or the like.

The present embodiments are examples of a vehicle floor structure in the present disclosure used for a seat installed in a vehicle such as a car (hereinafter, referred to as a vehicle seat). Arrows and other marks that indicate directions in the drawings are made for easy understanding of relationship between the drawings.

Accordingly, the invention of the present disclosure should not be limited by directions in the drawings. Directions in the drawings are defined in relation to the vehicle seat according to the present embodiments that is assembled to a car.

First Embodiment

1. Outline of Vehicle Seat

As shown in FIG. 1, a seat main body 2 of a vehicle seat 1 in a first embodiment comprises a seat cushion 3, a seatback 5, and the like. The seat cushion 3 is a member to support the buttocks of an occupant. The seatback 5 is a member to support the back of the occupant.

The seat main body 2 is installed in a vehicle via at least two sliding devices 7. The two sliding devices 7 slidably support the seat main body 2. The two sliding devices 7 have mostly the same structure. The description provided hereinafter explains a structure of a sliding device 7 arranged on the right side of a seat-width axis of the vehicle seat 1 and structures surrounding the sliding device 7; in other words, it explains a floor structure for a vehicle according to the present embodiment.

Figure 2:
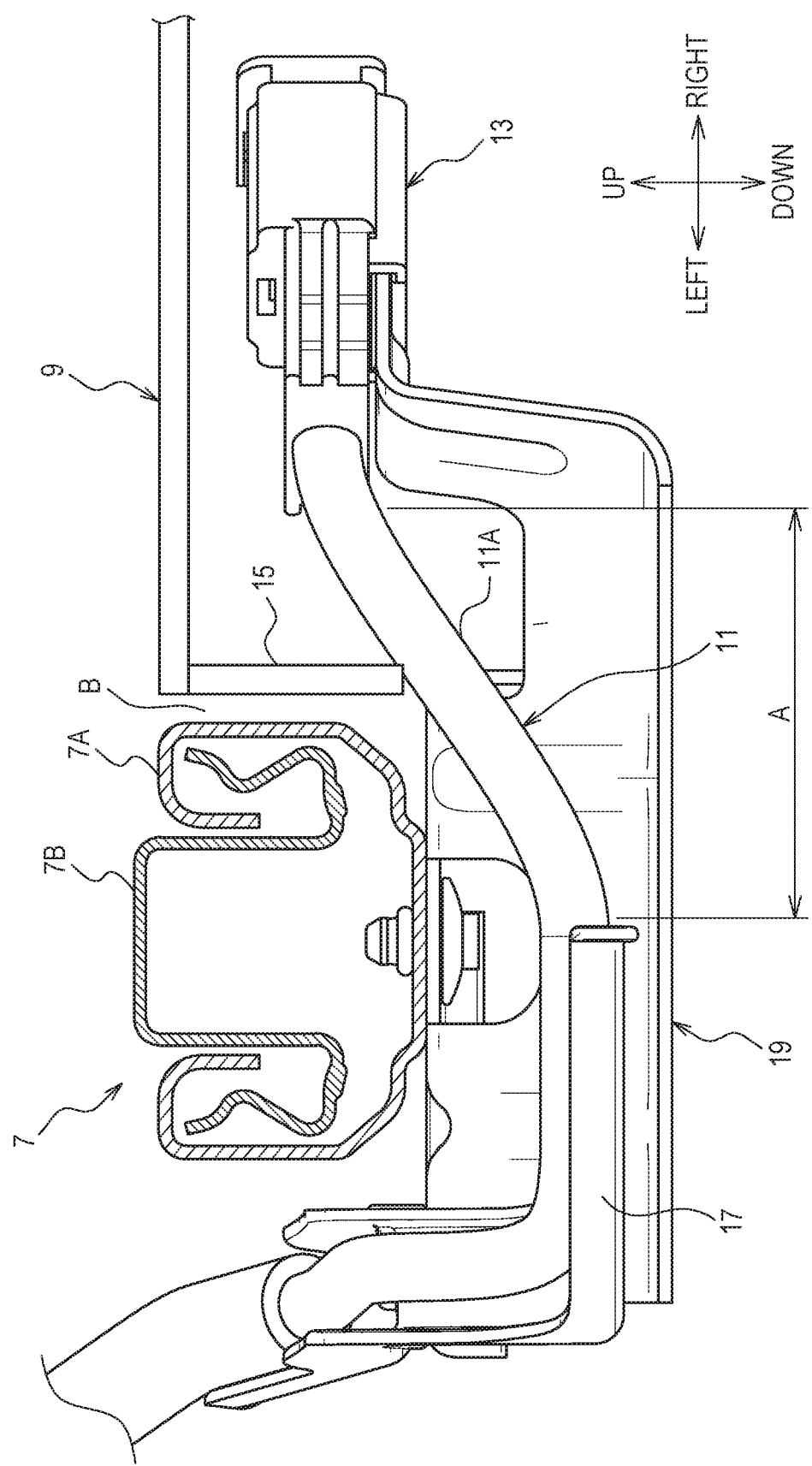
FIG. 2 is a diagram showing a vehicle floor structure in the first embodiment.

As shown in FIG. 2, the sliding device 7 comprises a fixed rail 7A, a movable rail 7B, and the like. The fixed rail 7A is directly or indirectly fixed to the vehicle. The fixed rail 7A according to the present embodiment is fixed to a body of the vehicle (not shown) via intermediate members such as a leg bracket 7C (see, FIG. 1).

The movable rail 7B is slidably attached to the fixed rail 7A. The seat main body 2 is fixed to the movable rail 7B. Thereby, the seat main body 2 can be displaced by sliding with respect to the vehicle. Sliding directions of the movable rail 7B, or the seat main body 2, agree with front-rear directions of the seat main body 2.

2. Vehicle Floor Structure

<Outline of Vehicle Floor Structure>

Figure 3:
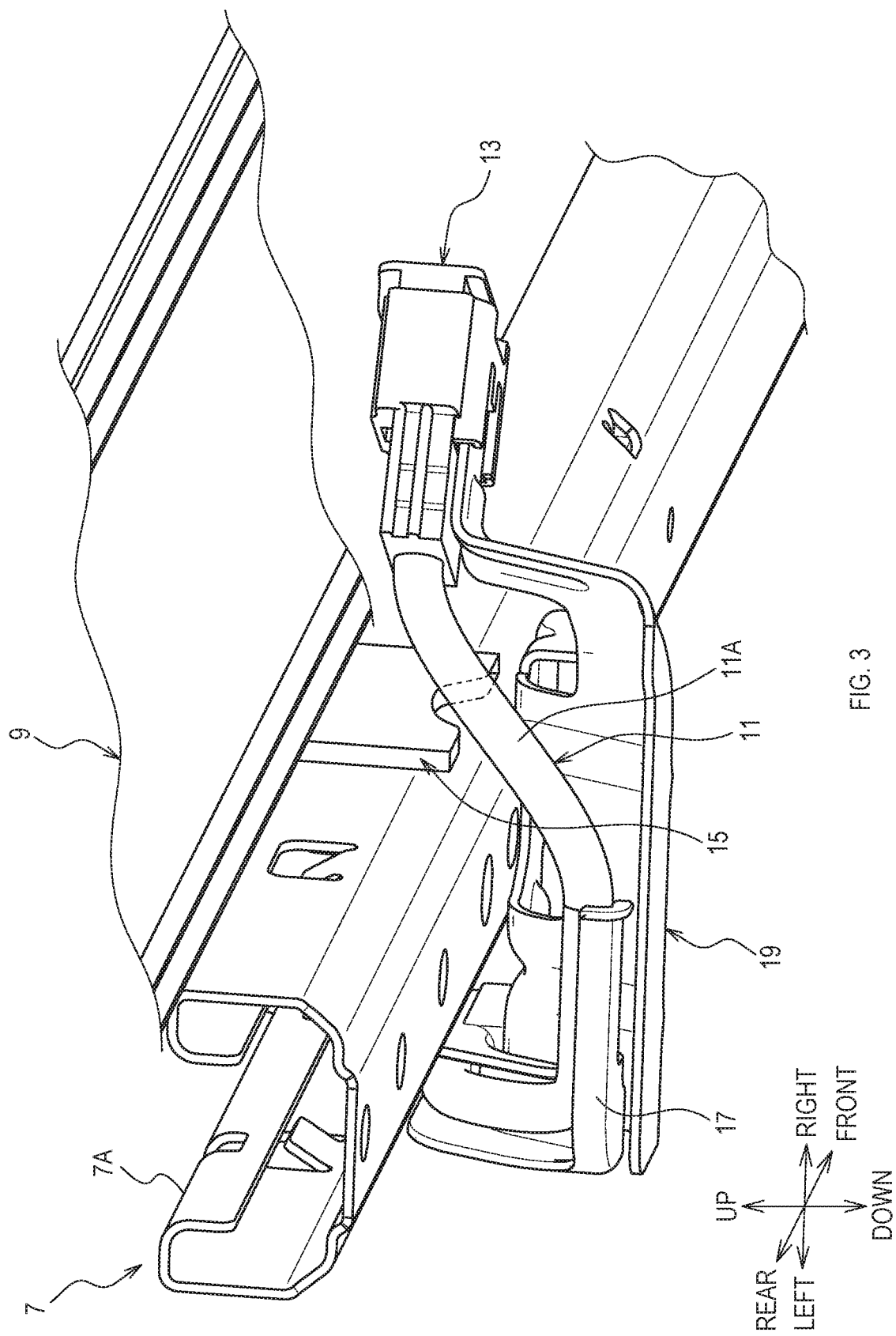
FIG. 3 is a diagram showing the vehicle floor structure in the first embodiment.

As shown in FIG. 3, the vehicle floor structure according to the present embodiment relates to a structure of a portion where at least a leg cover 9 and the sliding device 7 are arranged in an area where a wire harness 11 is arranged.

The leg cover 9 is one example of the first floor member arranged on a floor of the vehicle. The leg cover 9 covers the leg bracket 7C, which is configured to fix the movable rail 7B to a body of the car, and the like members.

The sliding device 7 (the fixed rail 7A in FIG. 3) is arranged in a position that is horizontally offset with respect to the leg cover 9 and is adjacent to the leg cover 9. Specifically, the fixed rail 7A is situated closer to the inner side of the vehicle than the leg cover 9 is (the fixed rail 7A is situated in the left side of the leg cover 9 in FIG. 3).

As shown in FIG. 2, the wire harness 11 is an electric wiring that comprises a portion situated below the leg cover 9 and the fixed rail 7A and extends from a leg cover 9 side to a fixed rail 7A side.

A connector 13 is coupled to an end of the wire harness 11 on the leg cover 9 side. The connector 13 is a fitting member configured to electrically couple the wire harness 11 to a different wire harness (not shown).

<Detailed Explanation of Vehicle Floor Structure>

A restrictor 15 is configured to restrict the position of a crossover portion 11A of the wire harness 11 such that the crossover portion 11A is situated below the connector 13. The crossover portion 11A is specifically a portion A that is a portion of the wire harness 11 situated below an interface between the leg cover 9 and the fixed rail 7A.

In the vehicle floor structure according to the present embodiment, the interface between the leg cover 9 and the fixed rail 7A comprises a space B, which is a gap leading to the crossover portion 11A. Thus, liquid droplets accumulated on an upper surface of the leg cover 9 may flow towards the crossover portion 11A via the space B.

According to the present embodiment, the restrictor 15 is disposed on the leg cover 9. The restrictor 15 is configured with a planar member that extends downwardly from an end of the leg cover 9 on the fixed rail 7A side, towards the crossover portion 11A. In the present embodiment, the restrictor 15 and the leg cover 9 are integrated into a one-piece article formed from metal or resin.

Figure 4:
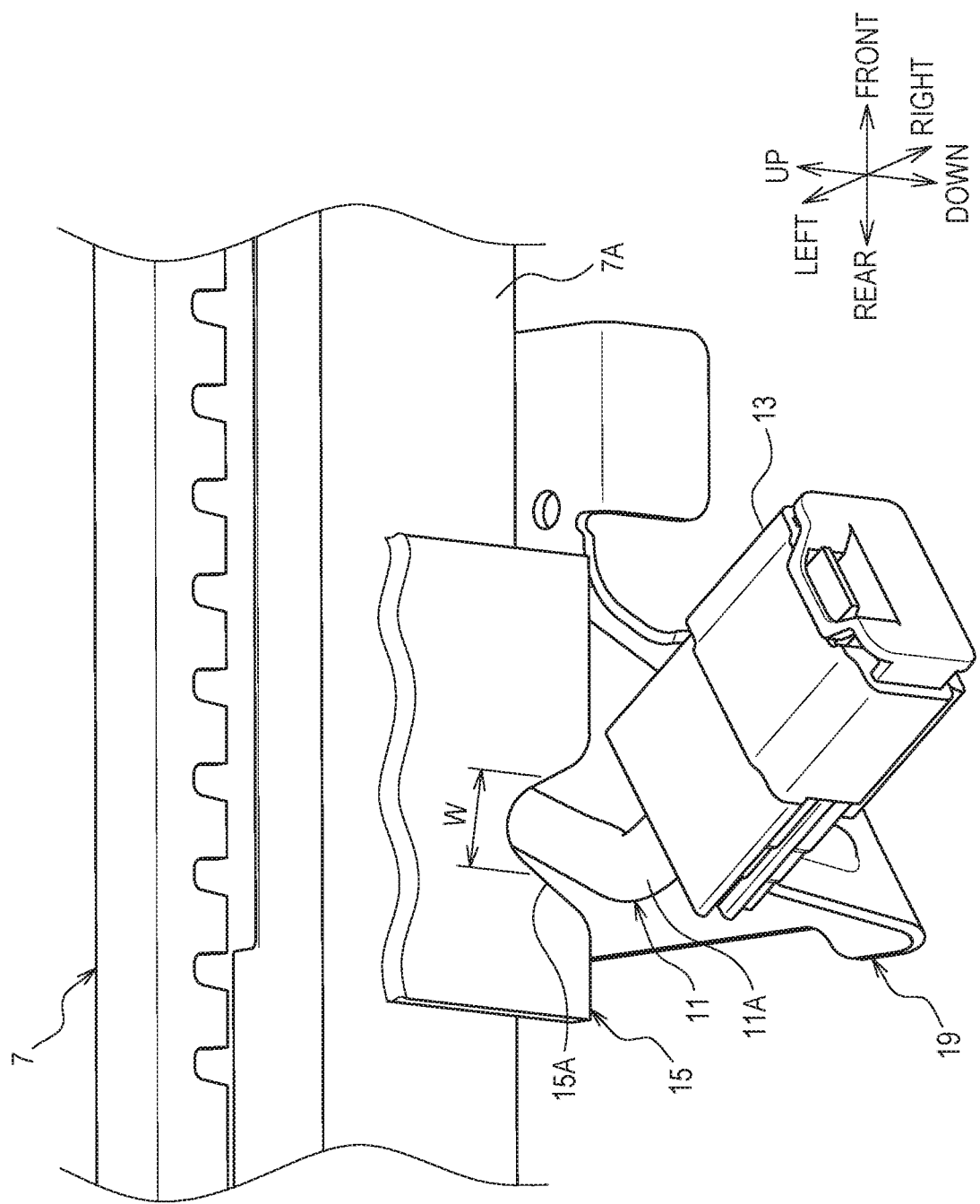
FIG. 4 is a diagram showing the vehicle floor structure in the first embodiment.

As shown in FIG. 4, the restrictor 15 comprises a recess 15A that can fit the crossover portion 11A. The recess 15A is an approximately triangular recess having a width W that decreases towards the leg cover 9, or an upper end of the recess 15A. The width W is a horizontal length of the recess 15A taken approximately orthogonally to the extending direction of the crossover portion 11A.

As shown in FIG. 2, a harness holder member 17 is situated on the opposite side of the connector 13 across the restrictor 15 along the seat-width axis. The harness holder member 17 is configured to hold at least a part of the wire harness 11 on the fixed rail 7A side.

According to the present embodiment, the harness holder member 17 is a gutter-shaped member configured to support the wire harness 11 from below. The harness holder member 17 is made of resin. The harness holder member 17 and the connector 13 are fixed to a support member 19 and supported by the support member 19.

The support member 19 is a bracket-shaped member arranged below the harness holder member 17 and the connector 13. The support member 19 is a metallic member fixed to the fixed rail 7A with a mechanical fastener such as a rivet.

3. Features of Vehicle Floor Structure in First Embodiment

A wiring position of the crossover portion 11A of the wire harness 11 is restricted by the restrictor 15 to be situated below the connector 13.

Thus, even in a case where a liquid such as water enters from the interface between the leg cover 9 and the fixed rail 7A towards the wire harness 11 and adheres to the crossover portion 11A, the fluid adhered to the crossover portion 11A can be inhibited from reaching the connector 13 via the crossover portion 11A.

In other words, even in a case where water adheres to the crossover portion 11A, the adhered water is not likely to move up to the height where the connector 13 is situated against the gravity. Accordingly, the water adhered to the crossover portion 11A can be inhibited from moving along the crossover portion 11A and reaching the connector 13.

The length of the crossover portion 11A is longer than the length of a straight line connecting the harness holder member 17 with the connector 13 (hereinafter referred to as the shortest length). This is because a worker's wiring workability might significantly drop when arranging the wire harness 11 if the length of the crossover portion 11A equals the shortest length.

Figure 5:
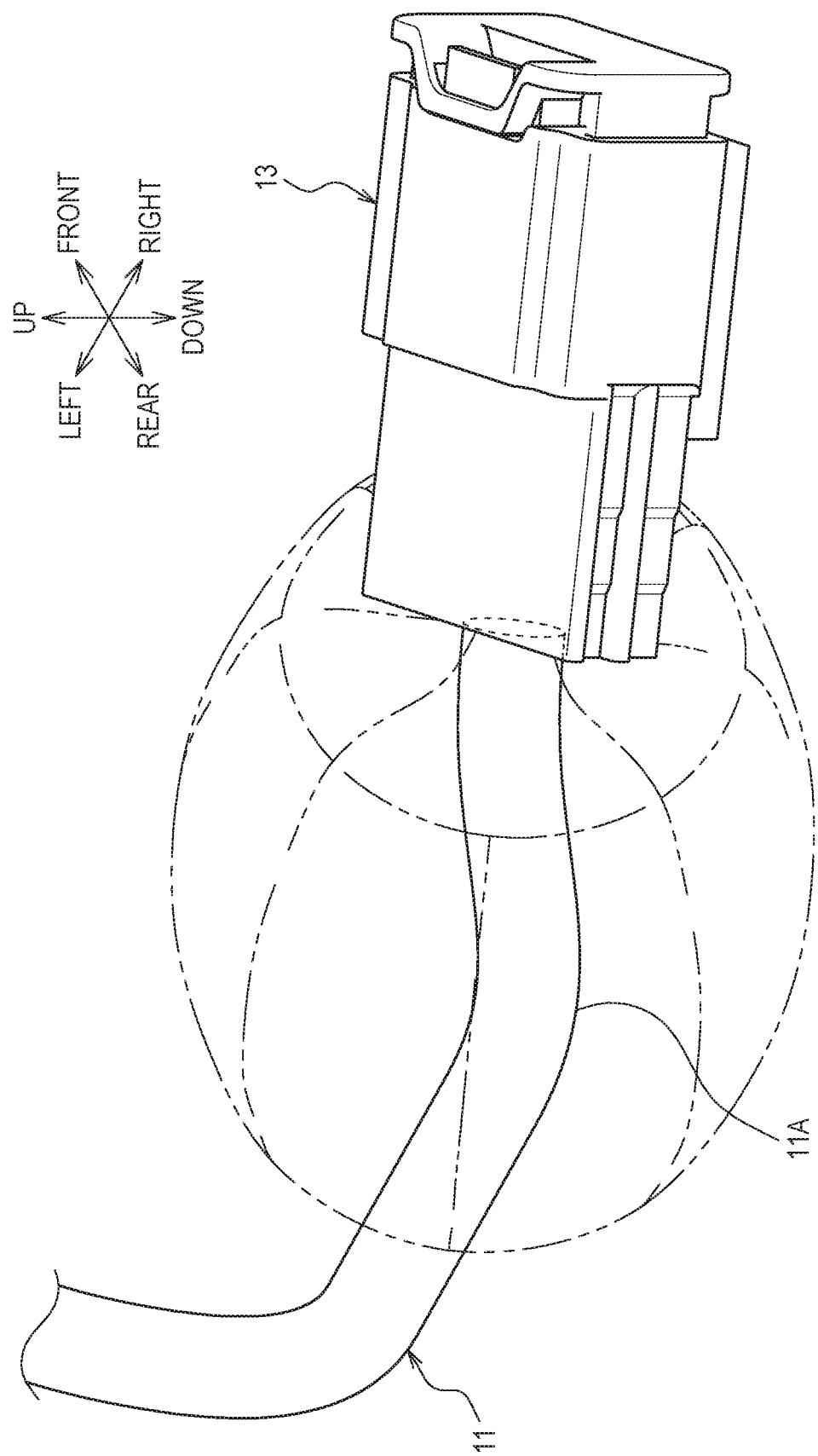
FIG. 5 is a diagram showing a space in which a crossover portion of a wire harness of a comparative example can be present.

Accordingly, in a configuration without the restrictor 15 as shown in a comparative example in FIG. 5, the crossover portion 11A can be anywhere in a space drawn with two-dot chain lines in FIG. 5. If the crossover portion 11A is situated above the connector 13, the water adhered to the crossover portion 11A can move along the crossover portion 11A and reach the connector 13.

In contrast, in the vehicle floor structure according to the present embodiment, even in a case where the water adheres to the crossover portion 11A, the adhered water can be inhibited from moving along the crossover portion 11A and reaching the connector 13.

The restrictor 15 is disposed on at least one of the leg cover 9 or the fixed rail 7A (the leg cover 9 in the present embodiment). This can facilitate installment of the restrictor 15 when manufacturing the vehicle floor structure.

The recess 15A formed in the restrictor 15 is shaped such that the width W is reduced towards the upper side of the restrictor 15. The crossover portion 11A fitted to the recess 15A thereby automatically moves to the top of the recess 15A and is stably situated at the top of the recess 15A.

Second Embodiment

Figure 6:
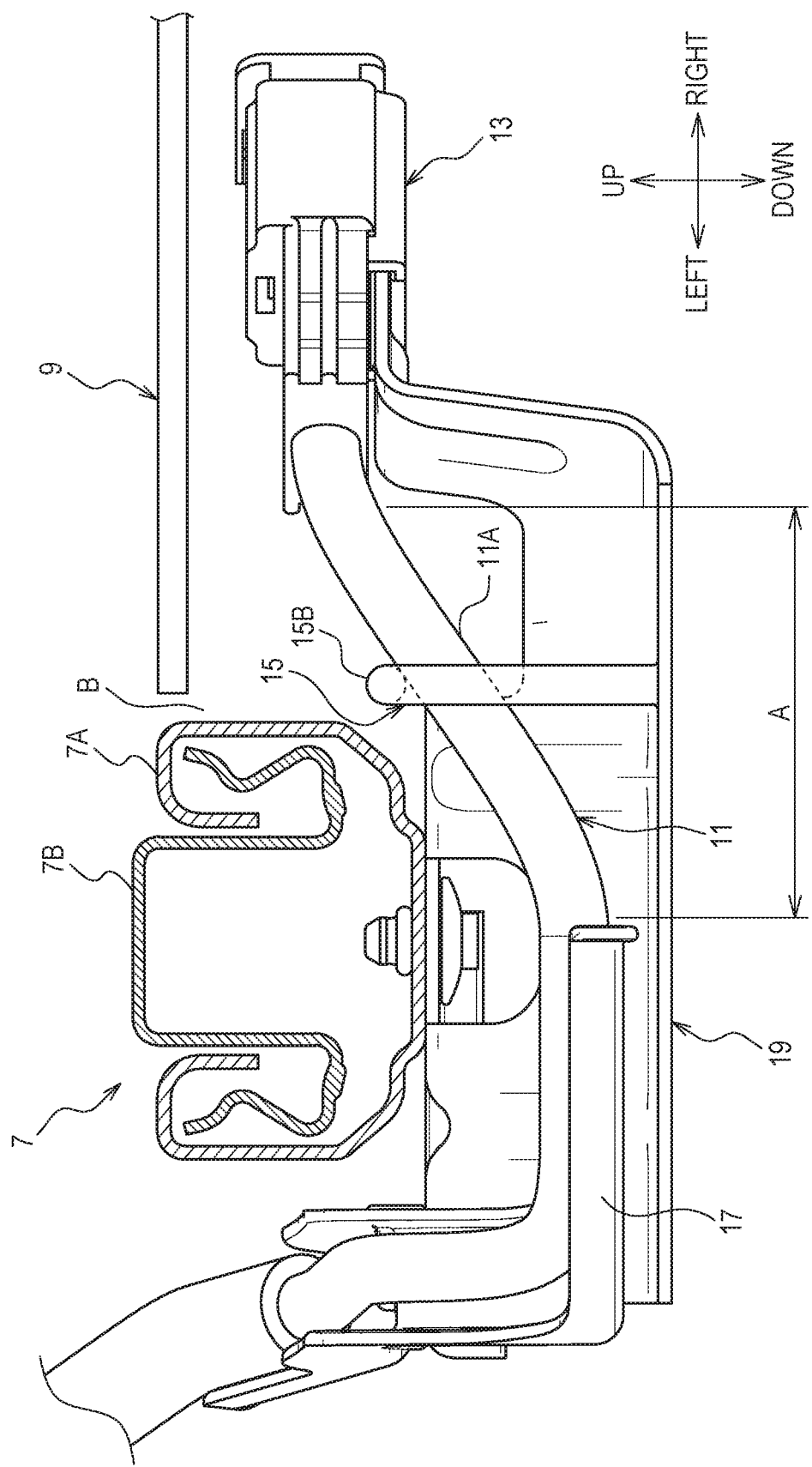
FIG. 6 is a diagram showing a vehicle floor structure in a second embodiment.
Figure 7:
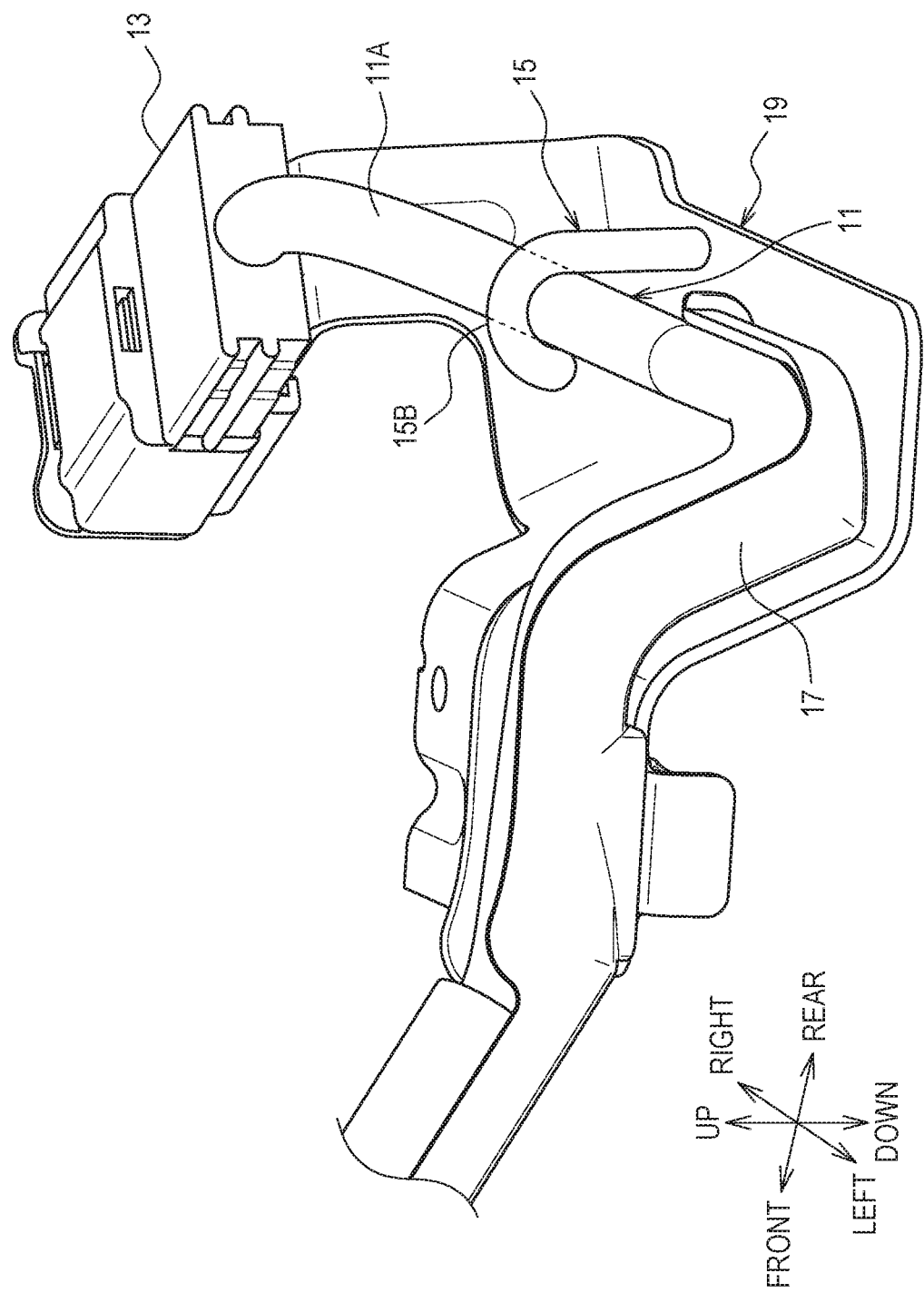
FIG. 7 is a diagram showing the vehicle floor structure in the second embodiment.

The restrictor 15 according to the first embodiment is situated on the leg cover 9. In contrast, as shown in FIG. 6 and FIG. 7, the restrictor 15 according to the second embodiment is situated on the support member 19.

The restrictor 15 comprises a hook 15B formed into an approximately L-shape or an approximately J-shape. The crossover portion 11A is hooked and engaged with the hook 15B. The restrictor 15 including the hook 15B is formed from resin or metal. The restrictor 15 is coupled to the support member 19.

This can facilitate installment of the restrictor 15 also in the present embodiment. The restrictor 15 according to the present embodiment restricts the position of the crossover position 11A by pulling the crossover portion 11A towards the support member 19. The restrictor 15 according to the present embodiment may also be formed from a string body such as a bundling tie.

Components identical to the components in the aforementioned embodiment are given the same reference numerals as those in the aforementioned embodiment. Therefore, overlapping explanations are omitted in the present embodiment.

Third Embodiment

Figure 8:
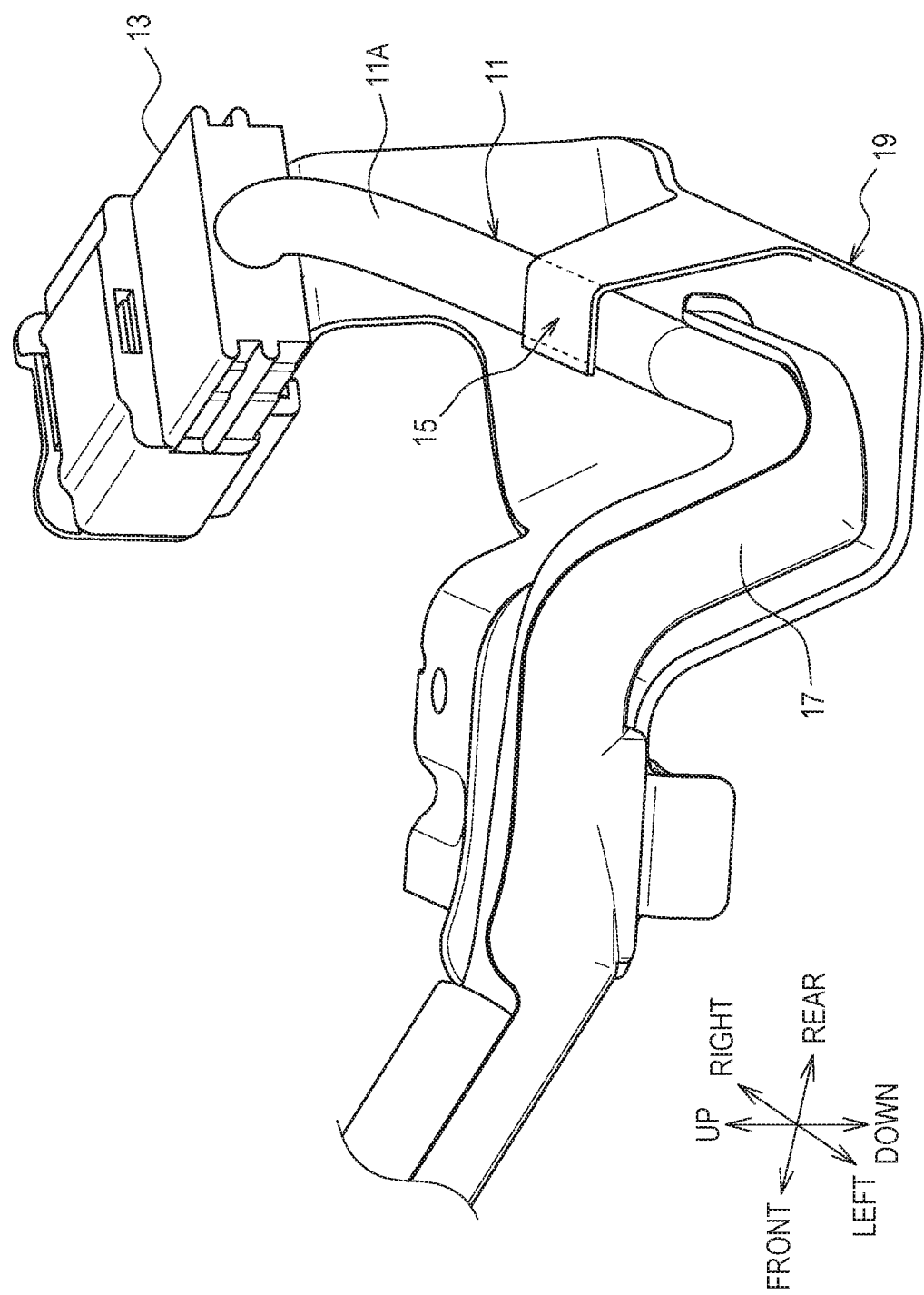
FIG. 8 is a diagram showing a vehicle floor structure in a third embodiment.

The restrictor 15 in the second embodiment is a hook formed into an approximately L-shape or an approximately J-shape. As shown in FIG. 8, the restrictor 15 in the third embodiment is formed with a flange, which is an extended portion of the support member 19.

Other Embodiments

The restrictor 15 according to the first embodiment is arranged on the leg cover 9. Nevertheless, the present disclosure should not be limited to this configuration. For example, the present disclosure may also include a configuration in which the restrictor 15 is arranged on the sliding device 7, which is the second floor member, or on the body of the vehicle.

In the aforementioned embodiments, the first floor member is the leg cover 9 that covers a part of the body of the vehicle; and the second floor member is the sliding device 7 that slidably supports the seat main body 2. Nevertheless, the present disclosure should not be limited to this configuration. For example, the first floor member may also be a panel material other than the leg cover 9; and the second floor member may also be a floor carpet, a floor panel, and the like.

In the aforementioned embodiments, the harness holder member 17 and the connector 13 are supported by the support member 19; and the support member 19 is fixed to the fixed rail 7A. Nevertheless, the present disclosure should not be limited to this configuration.

The present disclosure may also include a configuration in which, for example, the harness holder member 17 and the connector 13 are fixed to at least one of the first floor member, the second floor member, or the body of the car.

In the aforementioned embodiments, the vehicle floor structure in the present disclosure is used in a car. Nevertheless, use of the present disclosure should not be limited to a use in a car. The present disclosure may also be used in floor structures of railroad cars and other conveyances such as ships, boats, and aircrafts.

The present disclosure is not limited to the aforementioned embodiments as long as it falls within the spirit of the invention described in the claims. Accordingly, the present disclosure may be configured in combination of at least two of the aforementioned embodiments.

What is claimed is:

1. A vehicle floor structure comprising:
   a first floor member arranged on a floor of a vehicle;
   a second floor member arranged in a position that is horizontally offset with respect to the first floor member and is adjacent to the first floor member;
   a wire harness comprising a portion arranged below the first floor member and the second floor member, extending from a first floor member side to a second floor member side, and having an end situated on the first floor member side and coupled to a connector; and
   a restrictor configured to restrict a position of a crossover portion of the wire harness to be below the connector, the crossover portion being a portion of the wire harness situated below an interface between the first floor member and the second floor member.

2. The vehicle floor structure according to claim 1, wherein the restrictor is disposed on at least one of the first floor member or the second floor member.

3. The vehicle floor structure according to claim 1, wherein the restrictor is configured with a planar member extending from an end of the first floor member on the second floor member side towards the crossover portion.

4. The vehicle floor structure according to claim 3, wherein the restrictor comprises a recess configured to fit the crossover portion, and
   wherein the recess is an approximately triangular recess having a width that decreases towards an upper side of the restrictor.

5. The vehicle floor structure according to claim 1 further comprising:
   a harness holder member configured to hold at least a portion of the wire harness situated on the second floor member side; and
   a support member configured to support the harness holder member and the connector and arranged below the harness holder member and the connector,
   wherein the restrictor is disposed on the support member.

6. The vehicle floor structure according to claim 5, wherein the restrictor is a hook, a string body, or a flange, which is an extended portion of the support member.

7. The vehicle floor structure according to claim 1, wherein the first floor member is a leg cover that covers a part of a body of the vehicle; and the second floor member is a sliding device that slidably supports a seat main body.

* * * * *